US012117871B2

(12) United States Patent
Yuan et al.

(10) Patent No.: US 12,117,871 B2
(45) Date of Patent: Oct. 15, 2024

(54) MOBILE TERMINAL ACCOMMODATING FLEXIBLE CONNECTION PART

(71) Applicant: HUAWEI TECHNOLOGIES CO., LTD., Guangdong (CN)

(72) Inventors: Zhi Yuan, Shanghai (CN); Jian Shi, Shanghai (CN); Hanru Yu, Shanghai (CN); Linfang Jin, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/954,203

(22) Filed: Sep. 27, 2022

(65) Prior Publication Data

US 2023/0018137 A1    Jan. 19, 2023

Related U.S. Application Data

(63) Continuation of application No. PCT/CN2021/072104, filed on Jan. 15, 2021.

(30) Foreign Application Priority Data

Mar. 30, 2020    (CN) .......................... 202020442975.0

(51) Int. Cl.
*G06F 1/16*        (2006.01)
*G06F 1/20*        (2006.01)

(52) U.S. Cl.
CPC ............ *G06F 1/1652* (2013.01); *G06F 1/203* (2013.01)

(58) Field of Classification Search
CPC .... G06F 1/1616; G06F 1/1652; G06F 1/1656; G06F 1/203; G06F 1/1637; G06F 1/1641;
(Continued)

(56) References Cited

U.S. PATENT DOCUMENTS 6,324,055 B1 * 11/2001 Kawabe ................ G06F 1/1616
                                              361/705
10,469,635 B1 * 11/2019 Carlson ................ G06F 1/1683
(Continued)

FOREIGN PATENT DOCUMENTS

CN    103778858 A    5/2014
CN    108762394 A    11/2018
(Continued)

OTHER PUBLICATIONS

International Search Report and Written Opinion in International Appln. No. PCT/CN2021/072104, mailed on Apr. 22, 2021, 15 pages (with English translation).
(Continued)

*Primary Examiner* — Richard J Hong
(74) *Attorney, Agent, or Firm* — Fish & Richardson P.C.

(57) ABSTRACT

Example mobile terminals are disclosed. One example terminal includes a rotating member, a flexible screen, a bending support part, and a temperature equalization plate. The flexible screen includes two unfolded regions and a bent region that is disposed opposite to the rotating member. The bending support part is located between the flexible screen and the rotating member. The temperature equalization plate is configured to balance temperatures in the two unfolded regions and includes two temperature equalization parts opposite to the two unfolded regions in a one-to-one correspondence and a flexible connection part that connects the two temperature equalization parts. The flexible connection part is located on a side of the bending support part and away from the flexible screen.

16 Claims, 6 Drawing Sheets

(58) Field of Classification Search
CPC .... G06F 1/1683; G06F 1/1626; G06F 1/1624; H04M 1/0214; H04M 1/0268; H04M 1/0274

See application file for complete search history.

(56) References Cited

U.S. PATENT DOCUMENTS

| | | | | |
|---|---|---|---|---|
| 2009/0207569 | A1* | 8/2009 | Tsunoda | G06F 1/203 |
| | | | | 361/704 |
| 2013/0027886 | A1* | 1/2013 | Crooijmans | G06F 1/1624 |
| | | | | 361/704 |
| 2014/0240922 | A1* | 8/2014 | Watanabe | G06F 1/1656 |
| | | | | 361/679.54 |
| 2015/0233162 | A1* | 8/2015 | Lee | G06F 1/1641 |
| | | | | 16/223 |
| 2015/0257289 | A1* | 9/2015 | Lee | G06F 1/1652 |
| | | | | 361/749 |
| 2017/0123461 | A1 | 5/2017 | Kim et al. | |
| 2018/0284856 | A1* | 10/2018 | Shah | G06F 1/1616 |
| 2019/0041922 | A1* | 2/2019 | Kurma Raju | G06F 1/1637 |
| 2019/0196543 | A1* | 6/2019 | Mizoguchi | G06F 1/1626 |
| 2020/0356143 | A1* | 11/2020 | Oh | G06F 1/203 |
| 2022/0113759 | A1* | 4/2022 | Kurma Raju | G06F 1/203 |
| 2022/0321683 | A1* | 10/2022 | Luo | H04M 1/0274 |

FOREIGN PATENT DOCUMENTS

| | | |
|---|---|---|
| CN | 110445913 A | 11/2019 |
| CN | 209627419 U | 11/2019 |
| CN | 110796955 A | 2/2020 |
| EP | 3968127 A1 | 3/2022 |
| EP | 4020118 A1 | 6/2022 |
| EP | 4060966 A1 | 9/2022 |
| WO | 2019076081 A1 | 4/2019 |

OTHER PUBLICATIONS

Extended European Search Report in European Appln No. 21781491.2, dated Jul. 14, 2023, 11 pages.

* cited by examiner

MOBILE TERMINAL ACCOMMODATING FLEXIBLE CONNECTION PART

CROSS-REFERENCE TO RELATED APPLICATIONS

This application is a continuation of International Application No. PCT/CN2021/072104, filed on Jan. 15, 2021, which claims priority to Chinese Patent Application No. 202020442975.0, filed on Mar. 30, 2020. The disclosures of the aforementioned applications are hereby incorporated by reference in their entireties.

TECHNICAL FIELD

This application relates to the field of electronic device technologies, and in particular, to a mobile terminal.

BACKGROUND

In recent years, there are mobile phones and tablet computers in the market to meet a user' requirement for different display areas. With appearance of flexible screens, manufacturers further design foldable mobile terminals, to meet requirements for both a large screen and portability.

During research and development, to simplify a circuit, generally, elements with a relatively large volume such as a CPU and a camera module are disposed on one side of a rotating shaft, and an element with a relatively small volume is disposed on the other side of the rotating shaft. Due to this design, one side of the rotating shaft heats seriously, causing a color difference on the flexible screen. To resolve this, a temperature equalization plate is used to balance temperatures of parts that are of the flexible screen and that are located on two sides of the rotating shaft.

However, in the conventional technology, the temperature equalization plate is in contact with the flexible screen. After the mobile terminal is used for a long time, the temperature equalization plate is slack and arched to squeeze the flexible screen, which affects a display effect and causes poor user experience.

SUMMARY

This application provides a mobile terminal, to prevent a temperature equalization plate from arching to squeeze a flexible screen.

The mobile terminal provided in this application includes a rotating member, a flexible screen, a bending support part, and a temperature equalization plate. The flexible screen includes two unfolded regions and a bent region located between the two unfolded regions, and the bent region is disposed opposite to the rotating member. The bending support part is located between the flexible screen and the rotating member, to support the bent region of the flexible screen. The temperature equalization plate includes temperature equalization parts opposite to the two unfolded regions in a one-to-one correspondence and a flexible connection part that connects the two temperature equalization parts. The flexible connection part is located on a side that is of the bending support part and that is away from the flexible screen, to balance temperatures in the two unfolded regions. The flexible connection part of the temperature equalization plate is distributed on the side that is of the bending support part and that is away from the flexible screen. Therefore, even if the temperature equalization plate is slack after being used for a long time, the temperature equalization plate cannot squeeze the flexible screen after being slack and arched, because the flexible connection part of the temperature equalization plate is blocked by the bending support part and cannot be in contact with the bent region of the flexible screen. Therefore, user experience is improved.

There may be a plurality of locations for disposing each temperature equalization part of the temperature equalization plate.

For example, in a specific implementable solution, a housing is disposed on a side that is of each unfolded region of the flexible screen and that is away from a light-emitting surface. Each group of unfolded region, housing, and temperature equalization part that correspond to each other form a module group. In at least one module group, the temperature equalization part is located between the unfolded region and the housing, so that the temperature equalization part can exchange heat with the corresponding unfolded region more directly and effectively.

In a specific implementable solution, in a module group of each temperature equalization part located between the unfolded region and the housing that correspond to each other, an accommodation slot is formed between the housing and the bending support part. A thickness of the flexible connection part is greater than a width of the accommodation slot, to prevent the flexible connection part from passing through the accommodation slot to touch the flexible screen, thereby preventing the flexible screen from being squeezed by the flexible connection part of the temperature equalization plate.

In a specific implementable solution, a screen reinforcing plate configured to support the unfolded region is further disposed on a side surface that is of each unfolded region and that is away from a light-emitting surface. In a module group of each temperature equalization part located between the unfolded region and the housing that correspond to each other, an accommodation slot is formed between the housing and the bending support part. An orthographic projection of the screen reinforcing plate on the light-emitting surface of the flexible screen covers an orthographic projection of the accommodation slot on the light-emitting surface of the flexible screen. The screen reinforcing plate shields a corresponding region that is between the housing and the unfolded region and that is opposite to the accommodation slot. Even if the flexible connection part of the temperature equalization plate passes through the accommodation slot, the flexible connection part can touch the screen reinforcing plate at most and cannot be in contact with the flexible screen.

In a specific implementable solution, in the module group of each temperature equalization part located between the unfolded region and the housing that correspond to each other, there is overlapping between the orthographic projection of the screen reinforcing plate on the light-emitting surface of the flexible screen and an orthographic projection of the bending support part on the light-emitting surface of the flexible screen. The flexible connection part of the temperature equalization plate at least needs to pass through a slot channel between the screen reinforcing plate and the bending support part, to be in contact with the flexible screen, which further increases difficulty.

For another example, in a specific implementable solution, a housing is disposed on a side that is of each unfolded region of the flexible screen and that is away from a light-emitting surface. Each group of unfolded region, housing, and temperature equalization part that correspond to each other form a module group. In at least one module group, the temperature equalization part is located on a side that is of the housing and that is away from the flexible screen.

In a specific implementable solution, a rear cover is further disposed on a side surface that is of the housing and that is away from the flexible screen. In the module group of each temperature equalization part located between the unfolded region and the housing that correspond to each other, the temperature equalization part is fastened to the corresponding rear cover.

To prevent the flexible connection part from bearing relatively large tensile force in a process of opening or closing the mobile terminal, in a specific implementable solution, a redundant structure is formed in the flexible connection part. The redundant structure may be formed in a plurality of manners. For example, in a possible implementation, the flexible connection part is ripple-shaped. In another possible implementation, the flexible connection part is bend-shaped.

BRIEF DESCRIPTION OF DRAWINGS

FIG. 3a is a possible cross-sectional diagram of a temperature equalization plate shown in FIG. 2a;

DESCRIPTION OF EMBODIMENTS

To make the objectives, technical solutions, and advantages of this application clearer, the following further describes this application in detail with reference to the accompanying drawings.

To facilitate understanding of the mobile terminal provided in the embodiments of this application, a scenario to which the mobile terminal is applied is first described. The mobile terminal may be a foldable mobile phone, a foldable tablet computer, a foldable PDA, or the like. Disadvantages of an existing mobile terminal are described below by using a specific instance.

Figure 1A:
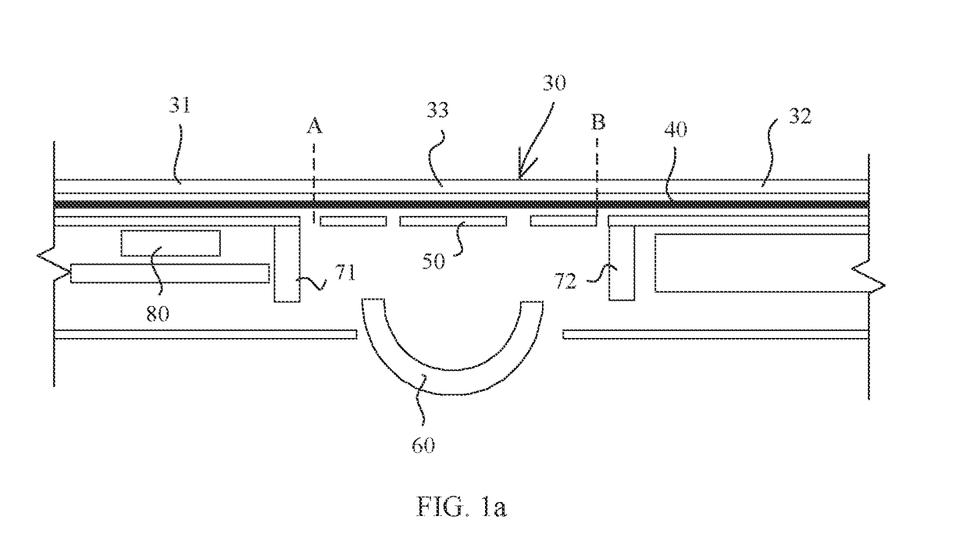
FIG. 1a is a schematic diagram of a structure of a mobile terminal in an expanded state in the conventional technology.
Figure 1B:
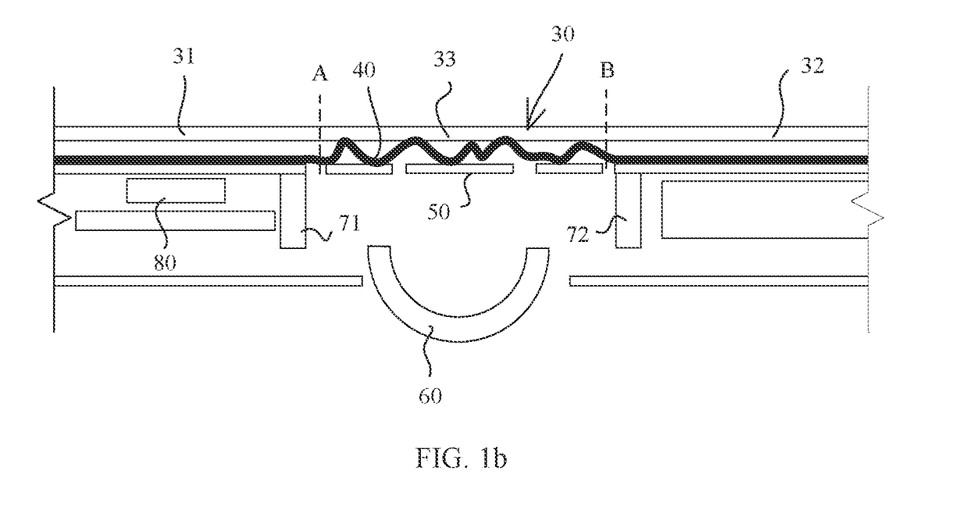
FIG. 1b is a schematic diagram of the mobile terminal shown in FIG. 1a after the mobile terminal is used for a long time.

FIG. 1a is a schematic diagram of a structure of a mobile terminal in an expanded state in the conventional technology. Referring to FIG. 1a, in the conventional technology, a foldable mobile phone is used as an example. The mobile terminal includes a flexible screen 30, a middle frame 71, a middle frame 72, a rotating shaft, a shaft housing 60, and a shaft support plate 50. The flexible screen 30 includes an unfolded region 31, an unfolded region 32, and a bent region 33 (a region between A and B) that connects the unfolded region 31 and the unfolded region 32. The middle frame 71 is located on a side that is of the unfolded region 31 and that is away from a light-emitting surface, and the middle frame 72 is located on a side that is of the unfolded region 32 and that is away from the light-emitting surface. The shaft support plate 50 is located on a side that is of the bent region 33 and that is away from the light-emitting surface, and is configured to provide active support the bent region 33. The shaft housing 60 is located on a side that is of the shaft support plate 50 and that is away from the flexible screen 30. The rotating shaft (not shown in the figure) is located between the shaft support plate 50 and the shaft housing 60, and the middle frame 71 cooperates with the middle frame 72 through rotation of the rotating shaft, so that the mobile terminal switches between a folded state and an expanded state. When the mobile terminal is in a folded state, a light-emitting surface of the unfolded region 31 is opposite to a light-emitting surface of the unfolded region 32. To simplify circuit design, an element with a relatively large volume is disposed in the middle frame 71, and an element with a relatively small volume is disposed in the middle frame 72. As a result, heat sources generating a relatively large amount of heat in the middle frame 71 are concentrated in the middle frame 71. For example, a CPU (Central Processing Unit) 80 is disposed in the middle frame 71, which generates a relatively large amount of heat. Consequently, the unfolded region 31 obviously suffers from more heat than the unfolded region 32. To resolve this problem, a temperature equalization plate 40 is added to balance temperatures in the unfolded region 31 and the unfolded region 32. The temperature equalization plate 40 sequentially passes between the unfolded region 31 and the middle frame 71, between the bent region 33 and the shaft support plate 50, and between the unfolded region 32 and the middle frame 72. FIG. 1b is a schematic diagram of the mobile terminal shown in FIG. 1a after the mobile terminal is used for a long time. Referring to FIG. 1b, as the mobile terminal is used for a longer time, a part that is of the temperature equalization plate 40 and that is opposite to the bent region 33 is slack and raised as the middle frame 71 and the middle frame 72 are repeatedly folded and expanded. As a result, the bent region 33 of the flexible screen 30 is partially arched, which affects user experience.

To resolve this problem, the embodiments of this application provide a mobile terminal.

Figure 2A:
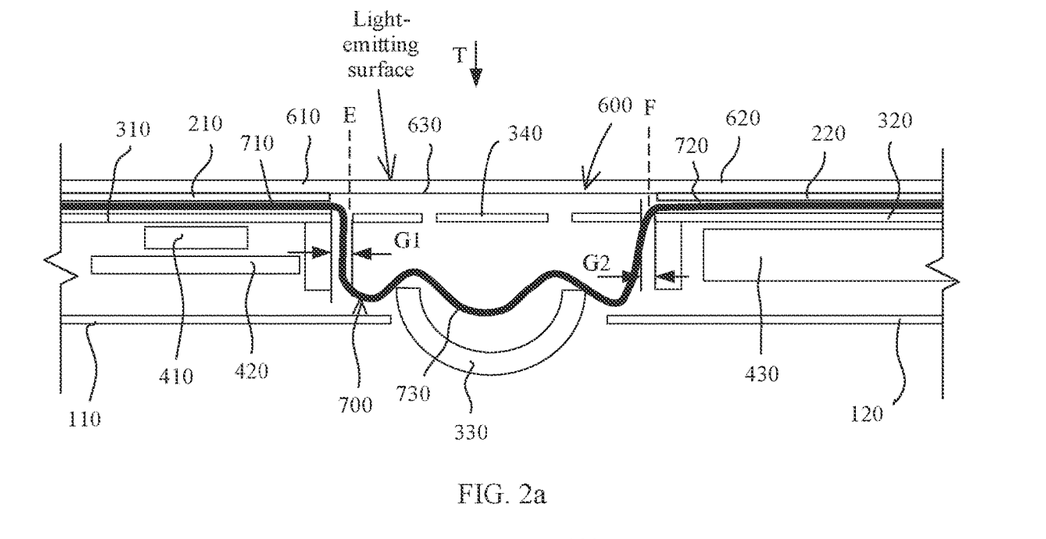
FIG. 2a is a schematic diagram of a mobile terminal in an expanded state according to an embodiment of this application.
Figure 2B:
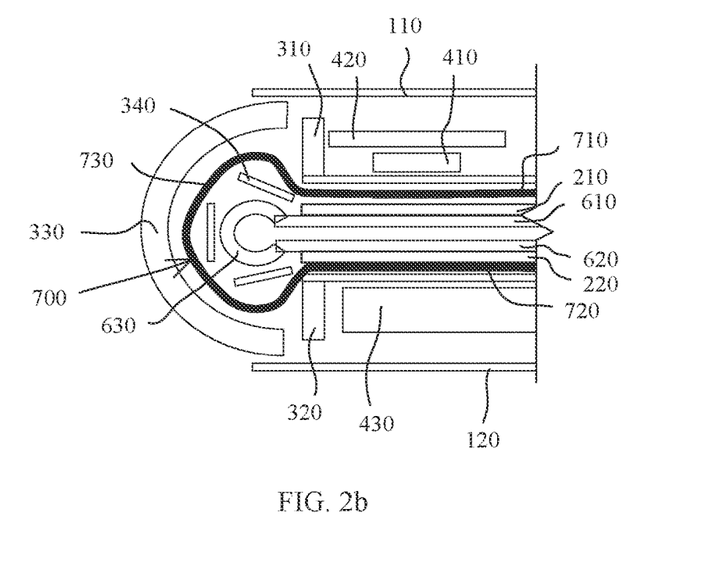
FIG. 2b is a schematic diagram of the mobile terminal shown in FIG. 2a in a folded state.
Figure 2C:
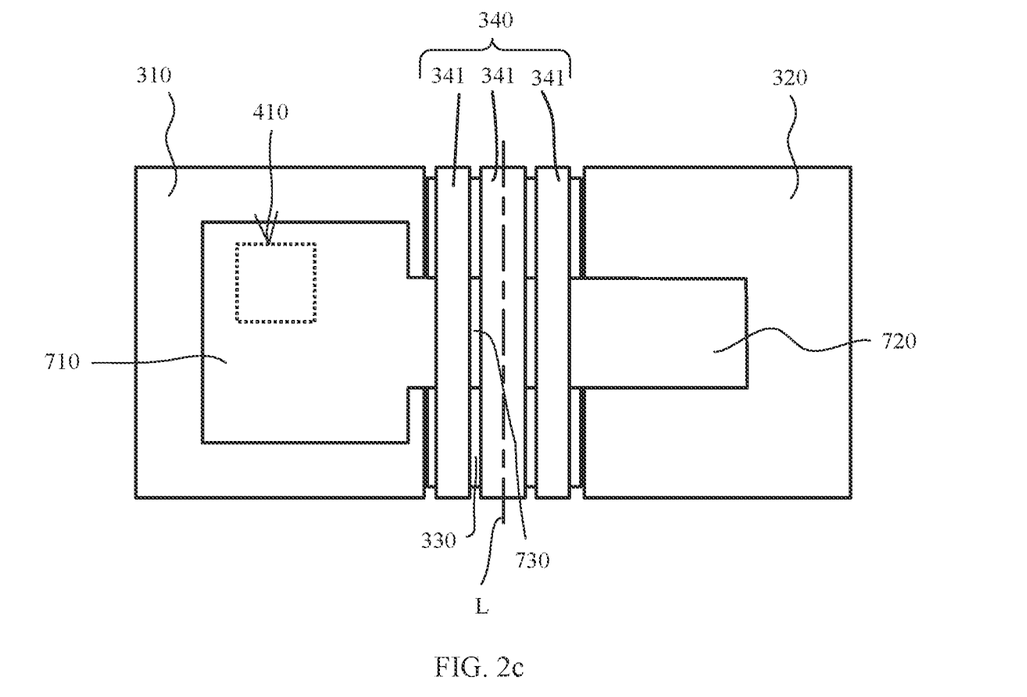
FIG. 2c is a T-direction view of a structure of the mobile terminal shown in FIG. 2a after a flexible screen and a screen reinforcing plate are removed.

FIG. 2a is a schematic diagram of a mobile terminal in an expanded state according to an embodiment of this application. FIG. 2b is a schematic diagram of the mobile terminal shown in FIG. 2a in a folded state. FIG. 2c is a T-direction view of a structure of the mobile terminal shown in FIG. 2a after a flexible screen and a screen reinforcing plate are removed. With reference to FIG. 2a, FIG. 2b, and FIG. 2c, using a mobile phone as an example, the mobile terminal includes a flexible screen 600, a folding support assembly, and a bending support part 340.

Still referring to FIG. 2a and FIG. 2b, the flexible screen 600 includes an unfolded region 610, an unfolded region 620, and a bent region 630 (a region between E and F) that connects the unfolded region 610 and the unfolded region 620. The bent region 630 is flexibly deformed when the mobile terminal switches between a folded state and expanded state. To provide better support for the unfolded region 610 and the unfolded region 620, the mobile terminal further includes a screen reinforcing plate 210 and a screen reinforcing plate 220. The screen reinforcing plate 210 is located on a back surface that is of the unfolded region 610 and that is away from a light-emitting surface, and is in contact with the back surface to provide support. The screen reinforcing plate 220 is located on a back surface that is of the unfolded region 620 and that is away from the light-emitting surface, and is in contact with the back surface to provide support.

With reference to FIG. 2a, FIG. 2b, and FIG. 2c, the folding support assembly includes a housing 310, a housing 320, and a rotating member (which is not shown in the figure for simplification) that connects the housing 310 and the housing 320. The housing 310 and the housing 320 are sometimes referred to as middle frames. The rotating member may be a hinge, or may be another part that has a flexible bending function. The housing 310 and the housing 320 cooperate in rotation around an axis L (refer to FIG. 2c) by using a rotating member such as a hinge. The housing 310 is located on a side that is of the unfolded region 610 and that is away from the light-emitting surface, and is disposed opposite to the unfolded region 610. The housing 310 has a bearing surface configured to provide support (which is indirect support in FIG. 2a) for the unfolded region 610. Similarly, the housing 320 is located on a side that is of the unfolded region 620 and that is away from the light-emitting surface, and is disposed opposite to the unfolded region 620. The housing 320 has a bearing surface configured to provide support (which is indirect support in FIG. 2a) for the unfolded region 620. The foregoing parts of the folding support assembly form a skeleton of the mobile terminal, and provide support for the parts of the flexible screen 600.

The mobile terminal further includes a circuit board 420 disposed in the housing 310 and a heat source 410 mounted on the circuit board 420, and the heat source 410 may be a CPU. A battery 430 is accommodated in the housing 320. The heat source 410 generates a relatively large amount of heat, and therefore the unfolded region 610 and the unfolded region 620 of the flexible screen 600 are heated unevenly. It should be understood that allocation of the elements in the housing 310 and the housing 320 is merely an example, and there may be another element layout that causes uneven heating of the flexible screen.

In addition, referring to FIG. 2a and FIG. 2b, the bending support part 340 is located on a side that is of the bent region 630 and that is away from the light-emitting surface. Referring to FIG. 2c, the bending support part 340 may be a shaft support plate. For example, the bending support part 340 may specifically include a plurality of support boards 341 arranged at intervals from the unfolded region 610 to the unfolded region 620. Each support board 341 extends in a direction of the axis L, and every two adjacent support boards 341 may be flexibly connected by using a flexible material. Therefore, each support board 341 may be well attached to the bent region 630 to provide active support for the folded region 630. The "active support" means the following: Referring to FIG. 2a, when the mobile terminal is in an expanded state, the bending support part 340 provides support for the bent region 630 as the bent region 630 expands. Referring to FIG. 2b, when the mobile terminal is in a folded state, the bent region 630 is flexibly bent, and the bending support part 340 still provides support for the bent region 630 as the bent region 630 is bent and deformed. However, it should be understood that the bending support part 340 is not limited to the form in FIG. 2c, and may also be another member that can provide active support for the bent region 630.

An accommodation slot G1 is formed between the housing 310 and the bending support part 340, and an accommodation slot G2 is formed between the housing 320 and the bending support part 340.

With reference to FIG. 2a to FIG. 2c, to transfer, to the unfolded region 620, heat emitted by the heat source 410, to balance heat received by the unfolded region 610 and heat received the unfolded region 620 and balance temperatures in the unfolded region 610 and the unfolded region 620, so as to reduce differences between colors in parts of the flexible screen 600, the mobile terminal provided in this embodiment of this application further includes a temperature equalization plate 700. The temperature equalization plate 70) includes a temperature equalization part 710, a temperature equalization part 720, and a flexible connection part 730 connecting the temperature equalization part 710 and the temperature equalization part 720. The temperature equalization part 710 is located between the screen reinforcing plate 210 and the housing 310, and the temperature equalization part 720 is located between the screen reinforcing plate 220 and the housing 320. A location at which the temperature equalization part 710 is connected to the flexible connection part 730 passes through the accommodation slot G1, and a location at which the temperature equalization part 720 is connected to the flexible connection part 730 passes through the accommodation slot G2. The flexible connection part 730 is located on a side that is of the bending support part 340 and that is away from the bent region 630, instead of passing between the bending support part 340 and the bent region 630. In this way, even if the flexible connection part 730 is slack and deformed after being used for a long time, because of shielding of the bending support part 340, the flexible connection part 730 does not easily touch the flexible screen 600, which mitigates and even eliminates a technical problem that the bent region 630 of the flexible screen 600 is partially arched because the temperature equalization plate 700 is slack, thereby improving user experience.

The unfolded region 610, the housing 310, and the temperature equalization part 710 form a module group, and the unfolded region 620, the housing 320, and the temperature equalization part 720 form a module group.

In FIG. 2a, to enable the mobile terminal to switch from an expanded state to a folded state, a material of the flexible connection part 730 needs to have a flexible property. However, when the mobile terminal switches to a folded state, the flexible connection part 730 is gradually tightened. To prevent the flexible connection part 730 from bearing relatively large tensile force to be damaged in a tightening process, the flexible connection part 730 is lengthened in the mobile terminal shown in FIG. 2a, so that a redundant structure is formed at one end of the flexible connection part 730. The "redundant structure" means the following: In a process in which the flexible connection part 730 extends from the temperature equalization part 710 to the temperature equalization part 720, an actual extended length of the flexible connection part 730 is greater than a minimum possible extended length of the flexible connection part 730 (that is, a length extended when the flexible connection part 730 extends clinging to a surface that is of the bending support part 340 and that is away from the flexible screen 600). As shown in FIG. 2b, the flexible connection part 730 just expands when the mobile terminal in FIG. 2a switches to a folded state, and the temperature equalization part 710 and the temperature equalization part 720 do not pull the flexible connection part 730 with relatively large tensile force, which prevents the flexible connection part 730 from being damaged. To form the redundant structure in the flexible connection part 730, the flexible connection part 730 may be further disposed in a ripple shape, which is alternatively referred to as a wrinkle shape. These ripples are arranged in a direction from the temperature equalization part 710 to the temperature equalization part 720, which can also cushion tensile force caused to the flexible connection part 730 when the mobile terminal is folded. Alternatively, the flexible connection part 730 may form a ripple based on the foregoing bend structure.

In addition, to protect various elements in the mobile terminal, still referring to FIG. 2a, the mobile terminal further includes a rear cover 110, a rear cover 120, and a shaft housing 330. The rear cover 110 is disposed on a side that is of the housing 310 and that is away from the flexible screen 600, and is fastened to the housing 310. The rear cover 120 is disposed on a side that is of the housing 320 and that is away from the flexible screen 600, and is fastened to the housing 320. The shaft housing 330 is disposed on a side that is of the bending support part 340 and that is away from the flexible screen 600. The rotating member such as a hinge configured to connect the housing 310 and the housing 320 is located between the bending support part 340 and the shaft housing 330. The flexible connection part 730 of the temperature equalization plate 700 may be located between the rotating member and the bending support part 340, or may be located between the rotating member and the shaft housing 330.

Figure 3A:
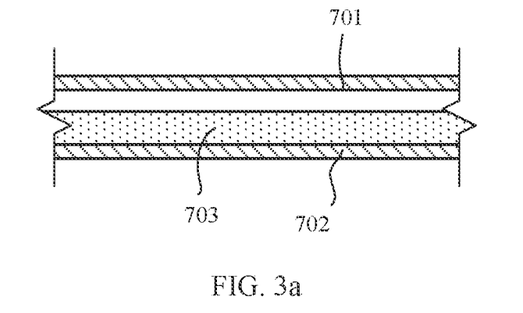

FIG. 3a is a possible cross-sectional diagram of the temperature equalization plate 700 shown in FIG. 2a. The temperature equalization plate includes a capillary structure 703, an upper cover plate 701, and a lower cover plate 702 that are disposed opposite to each other. The upper cover plate 701 and the lower cover plate 702 may form a closed cavity through welding or the like. The capillary structure 703 is disposed in the cavity, and the capillary structure 703 is filled with a specific amount of working fluid, such as a deionized water or other coolant, to form a phase change cycle system. A material of the upper cover plate 701 and a material of the lower cover plate 702 each may be a metal material such as copper or copper alloy, or may be a non-metal material with relatively good flexibility, such as polyimide PI, rubber, or another high molecular material. The capillary structure 703 may be made of copper powder, a copper braided mesh, or tow.

In addition, the temperature equalization plate 700 may be directly made of a material with relatively good heat dissipation performance, such as graphite or graphene, and a ripple or bend structure is formed in the flexible connection part 730; or both a ripple and a bend are used as redundant structures.

Figure 3B:
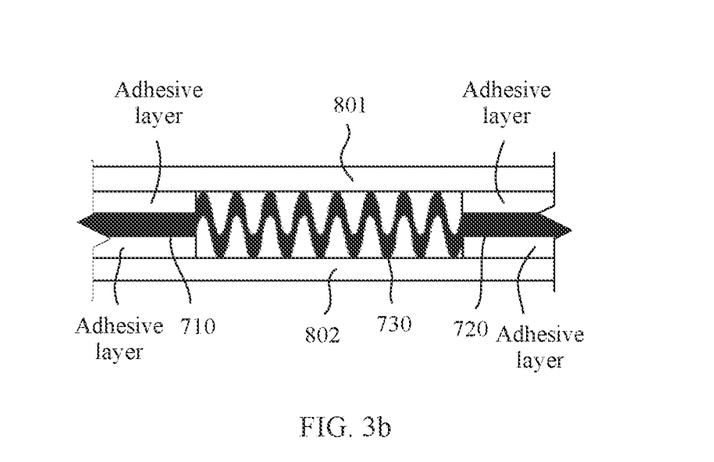
FIG. 3b is a schematic diagram of a structure of another temperature equalization plate that may be used in a mobile terminal according to an embodiment of this application.

FIG. 3b is a schematic diagram of a structure of another temperature equalization plate that may be used in a mobile terminal according to an embodiment of this application. Referring to FIG. 3b, both the temperature equalization part 710 and the temperature equalization part 720 are flat, and the flexible connection part 730 connecting the temperature equalization parts 710 and 720 is ripple-shaped. The temperature equalization part 710, the temperature equalization part 720, and the flexible connection part 730 each may be made of a material with relatively good heat dissipation performance, such as graphite or graphene. To protect the temperature equalization plate, protection layers 801 and 802 (not shown in FIG. 2a and FIG. 2b) are respectively disposed on two sides of the temperature equalization plate. Two sides of the temperature equalization part 710 are respectively bonded to the protection layers 801 and 802 by using an adhesive layer, and the temperature equalization part 720 is separately bonded to the protection layers 801 and 802 by using an adhesive layer, but the flexible connection part 730 is not bonded to the protection layers 801 and 802. The adhesive layer used herein refers to a material layer playing a bonding function, which may also have specific elasticity, may be compressed or stretched, and may be one or more layers.

Figure 4:
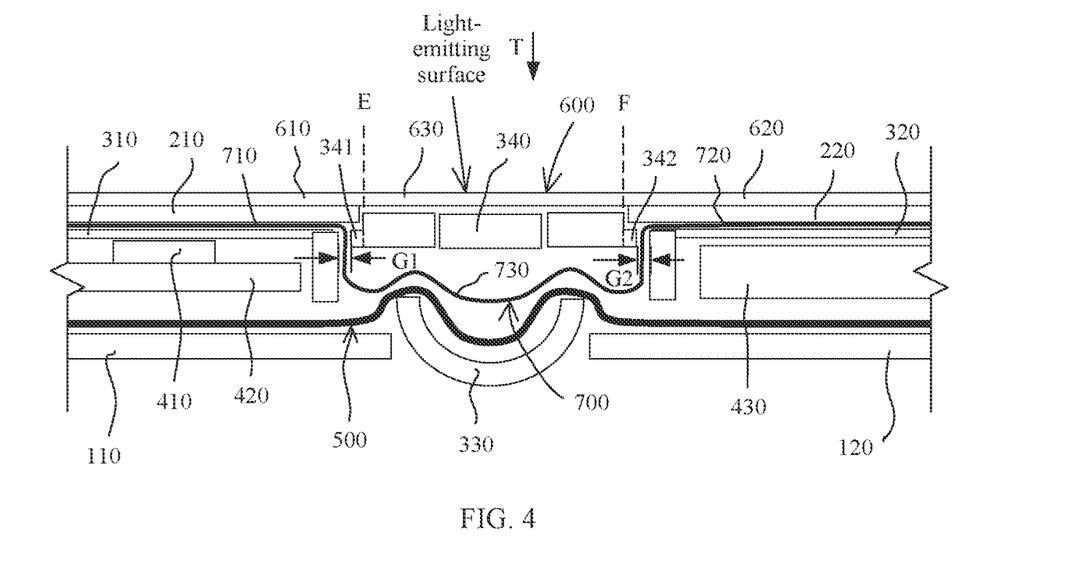
FIG. 4 is a schematic diagram of another mobile terminal in an expanded state according to an embodiment of this application.

FIG. 4 is a schematic diagram of another mobile terminal in an expanded state according to an embodiment of this application. Referring to FIG. 4, a difference between the mobile terminal shown in FIG. 4 and the mobile terminal shown in FIG. 2a lies in the following: A protruded part 341 (a part belonging to the bending support part 340) is formed at an end that is of the bending support part 340 and that is close to the housing 310. An accommodation slot G1 is formed between the protruded part 341 and the housing 310. An orthographic projection of the screen reinforcing plate 210 on the light-emitting surface of the flexible screen 600 covers an orthographic projection of the accommodation slot G1 on the light-emitting surface of the flexible screen 600. In addition, as observed in a T direction, the protruded part 341 and an edge part of the screen reinforcing plate 210 are alternatively disposed. In this case, a partial region of an orthographic projection of the protruded part 341 on the light-emitting surface of the flexible screen 600 overlaps a partial region of an orthographic projection of the screen reinforcing plate 210 on the light-emitting surface of the flexible screen 600. In other words, there is overlapping between the orthographic projection of the protruded part 341 on the light-emitting surface of the flexible screen 600 and the orthographic projection of the screen reinforcing plate 210 on the light-emitting surface of the flexible screen 600. In addition, the temperature equalization plate 700 still passes through the accommodation slot G1. In this case, to touch the flexible screen 600, the temperature equalization plate 700 needs to pass through a bent channel formed between the screen reinforcing plate 210 and a side surface that is of the bending support part 340 and that is close to the screen reinforcing plate 210, which further increases difficulty for the temperature equalization plate 700 to touch the flexible screen 600.

It should be understood that in addition to the manner shown in FIG. 4, there may be some variations that can also achieve a similar effect. For example, an accommodation groove is formed on the side surface that is of the bending support part 340 and that is close to the screen reinforcing plate 210, and an edge of the screen reinforcing plate 210 is fitted (a specific active gap is kept) into the accommodation groove. This can also prevent, to some extent, the temperature equalization plate 700 from touching the flexible screen 600. In conclusion, it is only required to ensure that there is overlapping between the orthographic projection of the screen reinforcing plate 210 on the light-emitting surface of the flexible screen 600 and an orthographic projection of the bending support part 340 on the light-emitting surface of the flexible screen 600.

However, to say the least, there is no overlapping between the orthographic projection of the screen reinforcing plate 210 on the light-emitting surface of the flexible screen 600 and the orthographic projection of the bending support part 340 on the light-emitting surface of the flexible screen 600, but an orthographic projection, of an edge that is of the bending support part 340 and that is close to the screen reinforcing plate 210, on the light-emitting surface of the flexible screen 600 overlaps the orthographic projection of the screen reinforcing plate 210 on the light-emitting surface of the flexible screen 600. In this case, the orthographic projection of the screen reinforcing plate 210 on the light-emitting surface of the flexible screen 600 can cover an orthographic projection of the accommodation slot G1 on the light-emitting surface of the flexible screen 600. Compared with the mobile terminal shown in FIG. 2a, this can still prevent, to some extent, the temperature equalization plate 700 from touching the flexible screen 600.

Similarly, still referring to FIG. 4, a protruded part 342 (a part belonging to the bending support part 340) is formed at an end that is of the bending support part 340 and that is close to the housing 320, and an accommodation slot G2 is formed between the protruded part 342 and the housing 320. For a relationship between the bending support part 340, the screen reinforcing plate 220, and the accommodation slot G2, correspondingly refer to the relationship between the bending support part 340, the screen reinforcing plate 210, and the accommodation slot G1.

In addition, in FIG. 2a, the mobile terminal further includes a flexible circuit board 500, and the flexible circuit board 500 sequentially passes between the housing 310 and the rear cover 110, between the shaft housing and the rotating member, and between the housing 320 and the rear cover 120. The flexible circuit board 500 may be configured to electrically connect lines on two sides of the rotating member, for example, electrically connect an electronic element on the housing 310 and an electronic element on the housing 320.

Figure 5:
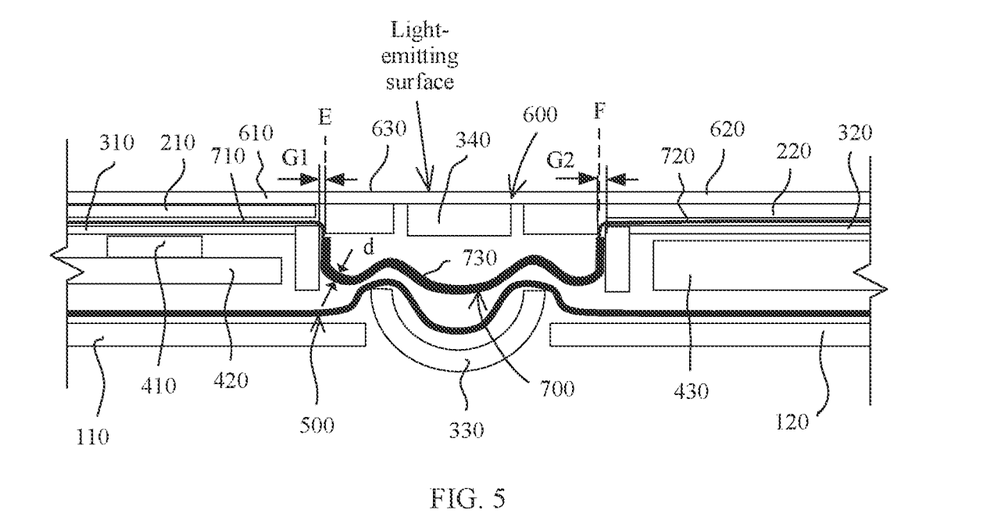
FIG. 5 is a schematic diagram of another mobile terminal in an expanded state according to an embodiment of this application.

FIG. 5 is a schematic diagram of another mobile terminal in an expanded state according to an embodiment of this application. Referring to FIG. 5, a difference between the mobile terminal shown in FIG. 5 and the mobile terminal shown in FIG. 2a lies in the following: A thickness d of the flexible connection part 730 is greater than a width of the accommodation slot G1, to prevent the flexible connection part 730 from passing through the accommodation slot G1 to touch a partial region that is of the flexible screen 600 and that is exposed from a slot between the bending support part 340 and the screen reinforcing plate 210, and further prevent the flexible connection part 730 from moving to a location between the screen reinforcing plate 210 and the housing 310. Therefore, it is always ensured that the temperature equalization part 710 is straight and is not easily arched, and the flexible connection part is also prevented from being tensioned to be damaged. Correspondingly, that the thickness d of the flexible connection part 730 is greater than a width of the accommodation slot G2 can also achieve a similar effect.

Figure 6A:
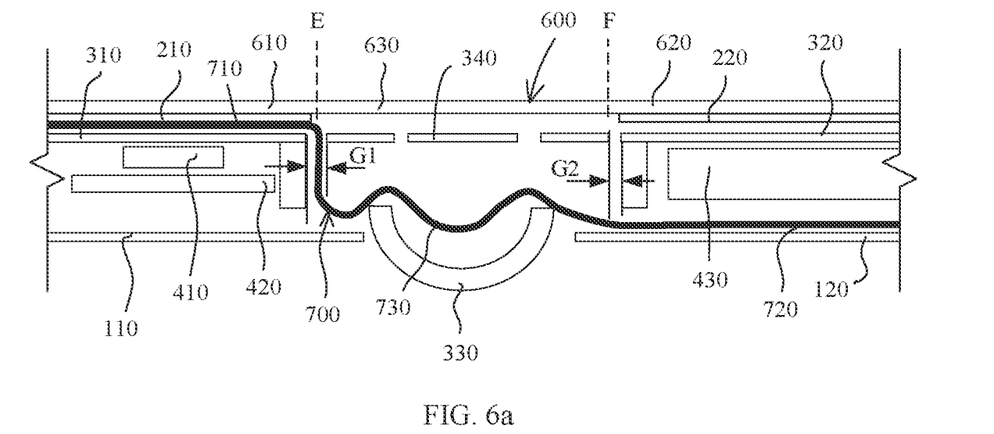
FIG. 6a is a schematic diagram of another mobile terminal in an expanded state according to an embodiment of this application.
Figure 6B:
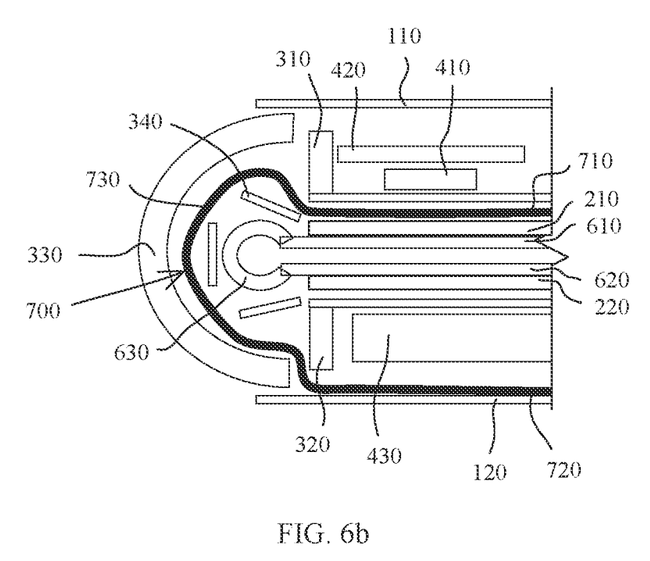
FIG. 6b is a schematic diagram of the mobile terminal shown in FIG. 6a in a folded state.

FIG. 6a is a schematic diagram of another mobile terminal in an expanded state according to an embodiment of this application. FIG. 6b is a schematic diagram of the mobile terminal shown in FIG. 6a in a folded state. Referring to FIG. 6a and FIG. 6b, a difference between the mobile terminal shown in FIG. 6a and FIG. 6b and the mobile terminal shown in FIG. 2a to FIG. 2c lies in the following: The temperature equalization part 710 is located between the housing 310 and the rear cover 110, and the temperature equalization part 710 may be bonded to the rear cover 110, which may also balance temperatures in the unfolded region 610 and the unfolded region 620. Setting may be specifically selected based on a requirement. Alternatively, the temperature equalization part 710 may be located between the housing 320 and the rear cover 120.

It should be understood that a variant may be made based on FIG. 2a, FIG. 4, and FIG. 5. The temperature equalization part 720 is disposed between the housing 310 and the rear cover 110, or the temperature equalization part 720 is disposed between the housing 320 and the rear cover 120.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:
1. A mobile terminal, comprising:
a rotating member;
a flexible screen, wherein the flexible screen comprises two unfolded regions and a bent region located between the two unfolded regions, and the bent region is disposed opposite to the rotating member, and a housing is disposed on a side of each unfolded region of the flexible screen and away from a light-emitting surface of the flexible screen;
a bending support part, wherein the bending support part is located between the flexible screen and the rotating member to support the bent region of the flexible screen; and
a temperature equalization plate configured to balance temperatures in the two unfolded regions, wherein:
the temperature equalization plate comprises two temperature equalization parts opposite to the two unfolded regions in a one-to-one correspondence and a flexible connection part that connects the two temperature equalization parts,
the flexible connection part is located on a side of the bending support part and away from the flexible screen,
each group of unfolded region, housing, and temperature equalization part that correspond to each other form a module group,
in at least one module group, the temperature equalization part is located between the unfolded region and the housing, and
in a module group of each temperature equalization part located between the unfolded region and the housing that correspond to each other, an accommodation slot is formed between the housing and the bending support part, and a thickness of the flexible connection part is greater than a width of the accommodation slot.

2. The mobile terminal according to claim 1, wherein:
a screen reinforcing plate configured to support the unfolded region is further disposed on a side surface of each unfolded region and away from the light-emitting surface; and
in a module group of each temperature equalization part located between the unfolded region and the housing that correspond to each other, an accommodation slot is formed between the housing and the bending support part, and an orthographic projection of the screen reinforcing plate on the light-emitting surface of the flexible screen covers an orthographic projection of the accommodation slot on the light-emitting surface of the flexible screen.

3. The mobile terminal according to claim 2, wherein in the module group of each temperature equalization part located between the unfolded region and the housing that correspond to each other, there is overlapping between the orthographic projection of the screen reinforcing plate on the light-emitting surface of the flexible screen and an orthographic projection of the bending support part on the light-emitting surface of the flexible screen.

4. The mobile terminal according to claim 1, wherein:
a housing is disposed on a side of each unfolded region of the flexible screen and away from a light-emitting surface of the flexible screen;
each group of unfolded region, housing, and temperature equalization part that correspond to each other form a module group; and
in at least one module group, the temperature equalization part is located on a side of the housing and away from the flexible screen.

5. The mobile terminal according to claim 4, wherein:
a rear cover is further disposed on a side surface of the housing and away from the flexible screen; and
in the at least one module group, the temperature equalization part is fastened to the corresponding rear cover.

6. The mobile terminal according to claim 1, wherein a redundant structure is formed in the flexible connection part.

7. The mobile terminal according to claim 6, wherein the flexible connection part is ripple-shaped.

8. The mobile terminal according to claim 6, wherein the flexible connection part is bend-shaped.

9. A mobile terminal, comprising:
a rotating member;
a flexible screen, wherein the flexible screen comprises two unfolded regions and a bent region located between the two unfolded regions, and the bent region is disposed opposite to the rotating member, and a housing is disposed on a side of each unfolded region of the flexible screen and away from a light-emitting surface of the flexible screen;
a bending support part, wherein the bending support part is located between the flexible screen and the rotating member to support the bent region of the flexible screen; and
a temperature equalization plate configured to balance temperatures in the two unfolded regions, wherein:
the temperature equalization plate comprises two temperature equalization parts opposite to the two unfolded regions in a one-to-one correspondence and a flexible connection part that connects the two temperature equalization parts,
the flexible connection part is located on a side of the bending support part and away from the flexible screen,
each group of unfolded region, housing, and temperature equalization part that correspond to each other form a module group,
in at least one module group, the temperature equalization part is located between the unfolded region and the housing,
a screen reinforcing plate configured to support the unfolded region is further disposed on a side surface of each unfolded region and away from the light-emitting surface; and
in a module group of each temperature equalization part located between the unfolded region and the housing that correspond to each other, an accommodation slot is formed between the housing and the bending support part, and an orthographic projection of the screen reinforcing plate on the light-emitting surface of the flexible screen covers an orthographic projection of the accommodation slot on the light-emitting surface of the flexible screen.

10. The mobile terminal according to claim 9, wherein in a module group of each temperature equalization part located between the unfolded region and the housing that correspond to each other, an accommodation slot is formed between the housing and the bending support part, and a thickness of the flexible connection part is greater than a width of the accommodation slot.

11. The mobile terminal according to claim 9, wherein in the module group of each temperature equalization part located between the unfolded region and the housing that correspond to each other, there is overlapping between the orthographic projection of the screen reinforcing plate on the light-emitting surface of the flexible screen and an orthographic projection of the bending support part on the light-emitting surface of the flexible screen.

12. The mobile terminal according to claim 9, wherein:
a housing is disposed on a side of each unfolded region of the flexible screen and away from a light-emitting surface of the flexible screen;
each group of unfolded region, housing, and temperature equalization part that correspond to each other form a module group; and
in at least one module group, the temperature equalization part is located on a side of the housing and away from the flexible screen.

13. The mobile terminal according to claim 12, wherein:
a rear cover is further disposed on a side surface of the housing and away from the flexible screen, and
in the at least one module group, the temperature equalization part is fastened to the corresponding rear cover.

14. The mobile terminal according to claim 9, wherein a redundant structure is formed in the flexible connection part.

15. The mobile terminal according to claim 14, wherein the flexible connection part is ripple-shaped.

16. The mobile terminal according to claim 14, wherein the flexible connection part is bend-shaped.

* * * * *

UNITED STATES PATENT AND TRADEMARK OFFICE
CERTIFICATE OF CORRECTION

PATENT NO. : 12,117,871 B2
APPLICATION NO. : 17/954203
DATED : October 15, 2024
INVENTOR(S) : Zhi Yuan et al.

It is certified that error appears in the above-identified patent and that said Letters Patent is hereby corrected as shown below:

In the Claims

In Column 12, In Line 46 (Approx.), In Claim 13, delete "screen," and insert -- screen; --.

Signed and Sealed this
Eleventh Day of February, 2025

Coke Morgan Stewart
*Acting Director of the United States Patent and Trademark Office*